United States Patent [19]

Meyer et al.

[11] 4,172,164
[45] Oct. 23, 1979

[54] METAL STRIP FOR THE PRODUCTION OF HEAT EXCHANGERS

[75] Inventors: Horst Meyer, Steisslingen; Manfred Gerber, Singen; Klaus Oehlmann, Engen; Ewald Reichardt, Singen, all of Fed. Rep. of Germany

[73] Assignee: Swiss Aluminium Ltd., Chippis, Switzerland

[21] Appl. No.: 910,358

[22] Filed: May 30, 1978

[30] Foreign Application Priority Data

Jun. 2, 1977 [DE] Fed. Rep. of Germany ... 7717356[U]

[51] Int. Cl.² .................... B32B 3/00; B01D 53/06
[52] U.S. Cl. .................... 428/72; 55/269; 55/390; 165/8; 428/178; 428/182; 428/184; 428/186
[58] Field of Search .................... 428/182, 72, 184, 186, 428/178, 183; 55/158, 267, 268, 269, 390, 528; 165/8, DIG. 8, DIG. 10, DIG. 12; 126/271

[56] References Cited

U.S. PATENT DOCUMENTS

| 3,112,184 | 11/1963 | Hollenbach | 165/DIG. 8 |
|---|---|---|---|
| 3,155,153 | 11/1964 | Axelsson | 165/8 |
| 3,716,441 | 2/1973 | Black et al. | 428/461 |
| 3,901,755 | 8/1975 | Martin et al. | 428/461 |
| 4,051,898 | 10/1977 | Yoshino et al. | 165/DIG. 12 |
| 4,055,268 | 10/1977 | Barthel | 428/461 |
| 4,089,324 | 5/1978 | Tjaden | 165/DIG. 8 |
| 4,093,435 | 6/1978 | Marron et al. | 55/269 |

FOREIGN PATENT DOCUMENTS 124860 5/1976 Japan.
979267 1/1965 United Kingdom.

*Primary Examiner*—William J. Van Balen
*Attorney, Agent, or Firm*—Bachman and LaPointe

[57] ABSTRACT

A metal strip is used for elements in a regenerative heat exchanger employed for the exchange of latent and sensible heat from a warm outgoing air stream to a cold ingoing air stream. The strip is placed alternatingly in the form of flat and corrugated sheets to form flow channels for the warm and cold air. The metal strip, for example, an aluminum foil, is coated or laminated at least on one side with a paper-like hydrophillic material. The hydrophillic layer comprises a mixture of cellulose fibers and fibers with olefin hydrocarbons as basis. Furthermore, fungicides can be added to the mixture.

11 Claims, 2 Drawing Figures

METAL STRIP FOR THE PRODUCTION OF HEAT EXCHANGERS

BACKGROUND OF THE INVENTION

This invention concerns a metal strip for the manufacture of elements for the exchange of sensible and latent heat from a warm outgoing air stream to a cold ingoing air stream in a regenerative heat exchanger, in which, for example, corrugated and flat sheets are alternatively combined to form flow channels.

In such regenerators component parts which are heated by the heat in the air passing over them give off this energy again to the cold air subsequently drawn over them. In this connection, it has been found that the transfer of both latent heat and sensible heat is very energy saving.

For such regenerative heating, use is made of rotating heat exchangers which have disc-shaped rotary units of flat and corrugated sheet or foil made of metal, asbestos or plastic but which have not been able to achieve optimum performance up to now. Metallic foils transfer sensible heat very well but, with respect to transfer of the latent heat, which results from the condensation of moisture from steam, they have a low efficiency. Asbestos blades achieve a better heat transfer from the condensed water but, because of the hazard it represents, asbestos cannot be used in ventilator systems.

Attempts have been made to overcome the disadvantage of metal rotary units, i.e., the poor absorbtion of moisture, by treating the blades with lithium chloride; the purpose of the resultant crystals on the metallic elements is to assist the conversion of steam to water.

The main problem of such regenerators lies in their manufacture in that the regenerator has to be treated to form the crystals after the metallic elements have been built into a heat exchanger. Also, it is doubtful whether such treatments to improve the absorption of moisture are adequate.

SUMMARY OF THE INVENTION

Accordingly, it is an object of the present invention to develop a metal strip of the kind described hereinabove, with which a regenerative heat exchanger can be manufactured simply and without any after treatment exhibiting the advantages shown by conventional metal rotary units and in addition being able to transport a sufficient quantity of moisture.

This object is achieved in terms of the invention via a metal strip, for example, aluminum foil, which is coated or laminated at least on one side with a paper-like hydrophillic material, preferably with a hydrophillic layer made up of a mixture of cellulose fibers and fibers based on polymerized olefin hydrocarbons. This layer can contain fibers of low pressure polyethylene and/or fibers of polypropylene.

Such a metal strip is able to absorb moisture from waste gases in cooling processes without the atmosphere falling below dew point conditions, and is able to release the heat to the cold air. Furthermore, the layer on the metal strip in accordance with the invention is extremely resistant to degradation and is very flame resistant, in particular when the fibers include from about 10 to 60 parts by volume of fibers of mineral wool, and preferably 20 to 40 parts by volume of fibers of mineral wool, in the mixture.

Since no chemicals which might be hazardous to the health need to be added to the material, in contrast to the known asbestos blades, there are no medical problems involved.

Both the service life and the reliability of the heat exchanger made from the metal strip are increased by adding at least one fungicide to the specific mixture; the growth of bacteria can then be almost completely suppressed.

The hydrophillic material may be joined, adhered or bonded to the metal strip by any desired means. It has been found particularly favorable to bond the hydrophillic material to the metal strip using a laminate mixture or medium with potassium silicate or sodium silicate as its basis, which also improves the resistance of the laminate layer to combustion at the same time. Water soluble resin or dispersion adhesive can also be employed as laminate material.

BRIEF DESCRIPTION OF THE DRAWINGS

The invention will now be explained further with the help of an exemplified embodiment illustrated by the drawings in which.

DETAILED DESCRIPTION OF THE PREFERRED EMBODIMENTS

Figure 2:
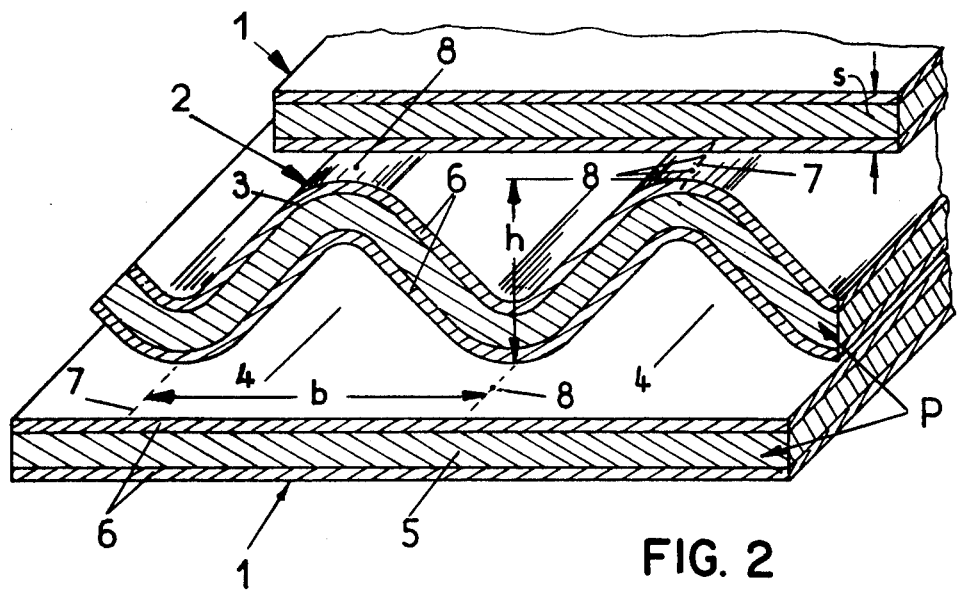
FIG. 2 is a detail of the heat exchanger shown much enlarged.
Figure 1:
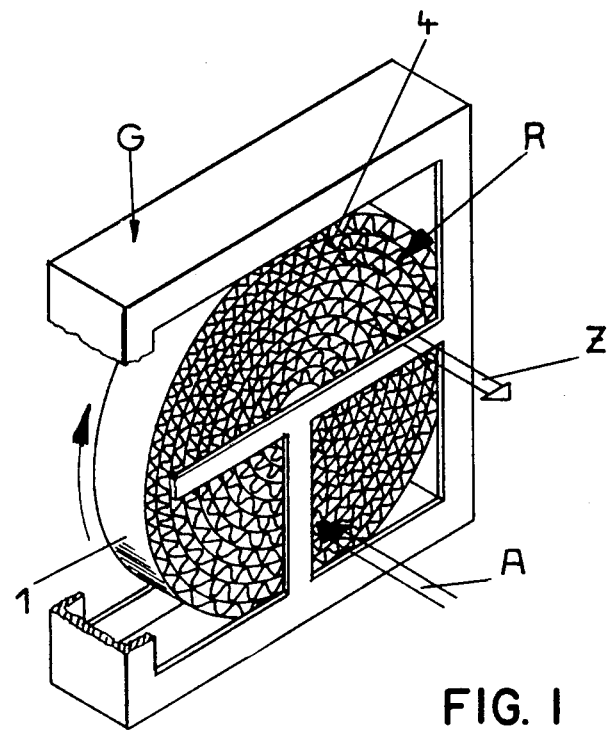
FIG. 1 is a perspective view of a heat exchanger.

Referring to FIG. 1, a rotary unit R of alternating flat sheet 1 and corrugated or wavy sheet 2 is mounted in a housing G. As can be seen in the detailed view of FIG. 2, the height h of the individual waves 3, specified by distance b, of the strip 2 determines the distance between the two flat strips 1. These flat strips 1 produce, with the wavy strip 2 between them, the flow channels 4 for the waste gas stream A which is drawn into them. This waste gas heats the heat exchanger unit R which in turn then heats the cool incoming air stream Z passing through the channels 4. Both the waste gas stream and the cool incoming air stream may be fed to the channels by conventional means, not shown. The waste gas stream may first heat the heat exchange unit R, followed by passing the cold air stream over the heated surfaces to transfer both the latent and sensible heat to the cold air stream.

Both the flat strips 1 and the shaped strips 2 are made from metal strip P, which preferably has a lightweight metal as its base 5, such as magnesium, aluminum or the like, with aluminum being preferred, coated on both sides with a layer 6 of a mixture of cellulose fibers and fibers of polymerized olefin hydrocarbons.

The aluminum strip 5 coated or laminated with that mixture of cellulose and/or other fibers, is cut into flat strips, some of which are shaped into wavy strip transverse to the length of the strip. Finally, the metal rotary unit is assembled as one or in sections, and the individual pieces of strip 1, 2 are joined along the lines of contact 7 by adhesion by any desired means at spots 8 on the lines of contact 7 or in another appropriate manner. The thickness 5 of the metal strip P is intentionally exaggerated in the figures shown. In the example presented here it is about 0.2 mm. However, the thicknesses of the metal strip and of the coatings are not critical.

Various additives may naturally be added to the hydrophillic material, such as fibers of wallastonite, and/or fibers of glass wool, and/or alumina.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Regenerative heat exchanger elements for the exchange of sensible and latent heat from a warm outgoing air stream to a cold ingoing air stream in a regenerative heat exchanger which comprises laminated metal strips coated on both sides with a paper-like hydrophillic material comprising a mixture of cellulose fibers and fibers based on polymerized olefin hydrocarbons in which corrugated and flat sheets of said strips are alternatingly combined to form flow channels.

2. A heat exchanger element according to claim 1 in which the mixture of fibers includes fibers selected from the group consisting of low pressure polyethylene and polypropylene.

3. A heat exchanger element according to claim 1 in which to the mixture of fibers about ten to sixty parts by volume of fibers of mineral wool is added.

4. A heat exchanger element according to claim 2 in which to the mixture of fibers, fibers selected from the group consisting of wallastonite and glass wool are added.

5. A heat exchanger element according to claim 1 in which alumina is added to the mixture.

6. A heat exchanger element according to claim 1 in which at least one fungicide is added to the mixture.

7. A heat exchanger element according to claim 1 in which the hydrophillic layer is joined to the metal strip by means of a laminate medium with sodium or potassium silicate as its basis.

8. A heat exchanger element according to claim 1 in which the hydrophillic layer is joined to the metal strip by means of water soluble resins.

9. A heat exchanger element according to claim 1 wherein said laminated strips are capable of absorbing moisture from waste gases in cooling processes and are able to release the heat to the cold air.

10. A heat exchanger element according to claim 1 wherein said metal is aluminum.

11. A heat exchanger element according to claim 1 wherein said elements comprise a rotary unit mounted in a housing.

* * * * *